(12) United States Patent
Paulk (10) Patent No.: US 8,768,627 B2
(45) Date of Patent: Jul. 1, 2014

(54) METHODS AND SYSTEMS OF ESTIMATING FORMATION PARAMETERS

(75) Inventor: Martin D. Paulk, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/995,604

(22) PCT Filed: Mar. 11, 2011

(86) PCT No.: PCT/US2011/028062
§ 371 (c)(1),
(2), (4) Date: Jun. 19, 2013

(87) PCT Pub. No.: WO2012/125139
PCT Pub. Date: Sep. 20, 2012

(65) Prior Publication Data
US 2013/0277115 A1 Oct. 24, 2013

(51) Int. Cl.
*G01V 9/00* (2006.01)
*G01V 11/00* (2006.01)
*E21B 47/00* (2012.01)

(52) U.S. Cl.
CPC *G01V 9/00* (2013.01); *G01V 11/00* (2013.01); *G01V 2210/6652* (2013.01); *G01V 2210/665* (2013.01); *E21B 47/00* (2013.01); *G01V 2210/66* (2013.01)
USPC .......................................................... 702/6

(58) Field of Classification Search
USPC .......................................................... 702/6
See application file for complete search history.

(56) References Cited

U.S. PATENT DOCUMENTS

| 4,697,650 A | 10/1987 | Fontenot |
| 5,355,088 A | 10/1994 | Howard, Jr. |
| 5,852,587 A | 12/1998 | Kostek et al. |
| 5,889,729 A | 3/1999 | Frenkel et al. |
| 5,963,036 A | 10/1999 | Wu et al. |
| 2002/0169559 A1 | 11/2002 | Onyia et al. |
| 2006/0161352 A1 | 7/2006 | Goswami et al. |

OTHER PUBLICATIONS

David Hill, Reentry drilling gives new life to aging fields, Oilfield review, autumn 1996, p. 4-17. http://www.slb.com/~/media/files/resources/oilfield_review/ors96/aut96/08960417.pdf.*
International Search Report and Written Opinion issued Dec. 12, 2011 in International Application No.a PCT/2011/028062 filed Mar. 11, 2011.

* cited by examiner

*Primary Examiner* — Tung S Lau
(74) *Attorney, Agent, or Firm* — Mark E. Scott; Conley Rose, PC (57) ABSTRACT

Estimating formation parameters. At least some of the illustrative embodiments are methods including: combining a first plurality of actual logs from a first plurality of actual boreholes, at least one actual log associated with each actual borehole, and thereby creating a first equivalent log along a first equivalent path; combining a second plurality of actual logs from a second plurality of actual boreholes, at least one actual log of the second plurality of actual logs associated with each actual borehole of the second plurality of actual boreholes, and thereby creating a second equivalent log along a second equivalent path; and estimating a plurality of values of a parameter of one or more formations along a proposed borehole path, each value associated with a distinct depth along the proposed borehole path, the estimating using the equivalent logs.

21 Claims, 9 Drawing Sheets

METHODS AND SYSTEMS OF ESTIMATING FORMATION PARAMETERS

CROSS-REFERENCE TO RELATED APPLICATIONS

None.

BACKGROUND

Identification of underground hydrocarbon bearing formations, and extraction of hydrocarbons from such formations, generates a significant amount of data. In particular, each borehole drilled into a hydrocarbon bearing formation may be logged by a host of different logging tools, both during drilling, and after the borehole is cased. Generally speaking, the data and information gathered about the earth formations surrounding the borehole are stored, and in many cases the data and information are used in the planning and drilling of other boreholes in relatively close proximity.

Consider a situation where multiple boreholes have been previously drilled into a hydrocarbon bearing formation, and multiple logs have been taken within each borehole. When planning the next borehole to be drilled, the formation properties along the proposed borehole path will be estimated using the logs from all the multiple previously drilled boreholes. The data resolution for each log may on the order of six inches (i.e., a datum in the log representing the value of the formation parameter measured for every six inches), and thus the number of data points to consider when estimating the formation properties along the proposed borehole path is enormous. For this reason, in the related art updating of models or predictions of formation parameters along a proposed borehole path cannot be accomplished in real time with the drilling along the proposed borehole path.

Thus, any advance which results in an ability to calculate updates of predicted formation parameters in less time or with less computing power, would provide a competitive advantage.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Real time" shall mean completing a task with respect to a borehole while the drill bit is advancing through a formation and before the borehole length increases 100 feet.

"Near" in relation to a drill bit shall mean within 100 feet of the drill bit.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
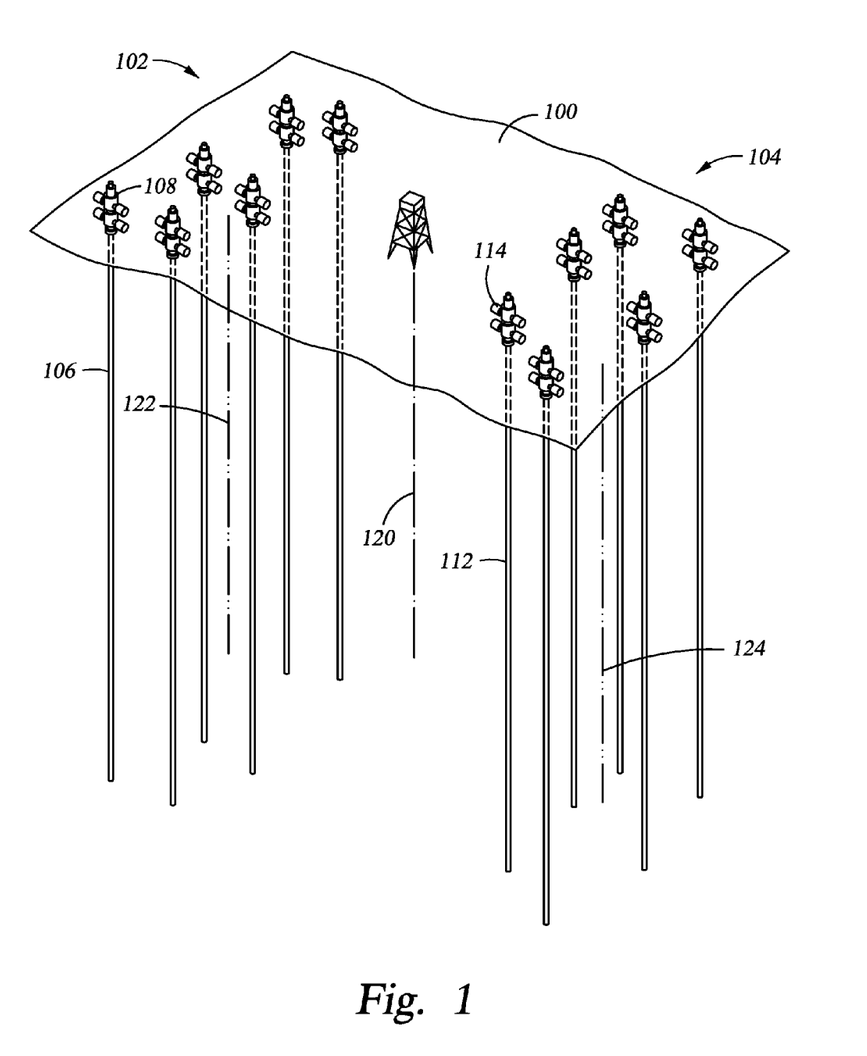
FIG. 1 shows a perspective view of a plurality of boreholes in accordance with at least some embodiments.

The various embodiments of the invention are directed to systems and related methods of updating modeled or predicted formation parameters, particularly modeled or predicted parameters along a proposed borehole path, and more particularly while drilling along the proposed borehole path. FIG. 1 shows a perspective cut-away view of several boreholes drilled into underground formations. In particular, FIG. 1 shows the surface 100, and in this illustrative case twelve boreholes (shown in dashed lines when obscured by the surface, and solid lines otherwise), the boreholes drilled from the surface. For purposes of explanation, the illustrative twelve boreholes are grouped into a first group of boreholes 102, and a second group of boreholes 104.

In the first group of boreholes 102, borehole 106 is illustrative. Borehole 106 illustratively comprises a wellhead 108 at the surface 100, and borehole 106 extends from the wellhead 108 at the surface to an underground location. Likewise, in the second group of boreholes 104, borehole 112 is illustrative. Borehole 112 illustratively comprises a wellhead 114 at the surface 100, and the borehole 112 extends from the wellhead 114 at the surface to an underground location. Before proceeding, several points should be understood. First, the wellheads of a first group of boreholes 102 are shown in a well defined pattern, and each borehole (e.g., 106) is shown as a vertical borehole; however, the layout of the wellheads and orientation of the boreholes in the first group of boreholes 102 is merely illustrative. In practice, the surface location of wellheads may be seemingly random, and the boreholes may be deviated boreholes, heading in any particular direction, including horizontal or lateral boreholes. The same simplifications to the layout and orientation of the second group of boreholes 104 have also been made so as not to unduly complicate the figure. Finally, the boreholes of the first and second groups of boreholes 102 and 104 need not be hydrocarbon producing boreholes. That is, any or all of the boreholes of the first and second group of boreholes 102 and 104 may be survey boreholes, used to gather information for drilling further boreholes intended to be hydrocarbon producing. For example, one or more of the first and second groups of boreholes 102 and 104 may be "survey" wells used to gather information for determining placement of lateral boreholes in a shale formation.

Regardless of the layout, orientation or intended use of each borehole, each borehole will have at least one "log" associated with the borehole. "Log" used a noun is a term of art referring to a set of data created from "logging tools" moved through the borehole. The movement of the logging tools may be: while the borehole is being drilled; before the borehole is drilled to its final depth, but during a period of time when the drill string has been removed or "tripped" from the borehole; or after the borehole is drilled to its final depth and the casing has been placed therein. The verb "logging" is also a term of art that refers to the acts to acquire a log. In some cases, a log is a visual representation of the data, such as a line or graph that plots data with respect to an axis that depicts depth where each datum is measured. In other cases, a log is a series of numbers correlated to depth (and from which the graphical representation of the log may be created). However, for purposes of this specification and claims, log shall refer to the data taken by a logging tool, regardless of the form of the data (e.g., series of numbers correlated to depth, a graphical representation).

In accordance with particular embodiments, the data of the logs associated with each borehole of the first and second groups of boreholes 102 and 104 are used to estimate, or make a model, of expected formation parameters along a proposed borehole path (i.e., along an expected path of a borehole that has yet to be drilled, or which portions have yet to be drilled). Still referring to FIG. 1, the owner or operator of the field illustrated by FIG. 1 may have plan to drill an additional borehole within the field, as illustrated by proposed borehole 120 (shown as a dash-dot-dash line), and the estimate or model of the expected formation properties along the proposed borehole 120 is made using data from logs from some or all of the first and second groups of boreholes 102 and 104. Further, in accordance with a particular embodiment, the estimate or model of the formation properties along the proposed borehole 102 is updated in real time as the borehole is being drilled (i.e., as the drill bit is turning and the drill string is advancing) along the proposed borehole path.

However, the amount of data corresponding to the first and second groups of boreholes 102 and 104 may be enormous. For example, each borehole in each of the first and second groups of boreholes 102 and 104 may have ten or more logs associated therewith. For example, illustrative borehole 106 associated with wellhead 108 may have ten or more logs taken over the course of creation of the borehole or after the borehole has had a casing cemented therein. The illustrative ten logs may be taken: while drilling; by wireline tools moved through the borehole before drilling is complete but during periods of time when the drill string has been removed; or by wireline devices moved through the borehole after the borehole has had a casing cemented therein. If just ten logs are taken for each borehole, the illustrative first group of boreholes 102 may have sixty logs of data to be considered when building the estimate or model of formation parameters along the proposed borehole path 120. The illustrative second group of boreholes 104 may have a similar number of logs to be simultaneously considered when building the estimate or model of formation parameters along the proposed borehole path 120.

What is more, the number of logs for each illustrative borehole may identify multiple "surfaces." That is, a log within borehole may identify, directly or indirectly, boundaries or transitions between different formation types. Each boundary may be a "surface" of interest, and the location of each surface within each borehole of the first and second groups of boreholes 102 and 104 may be used to create the estimate or model of the formation parameters along the proposed borehole 120.

In the related art, the amount of data to be considered when making the estimate or model along the proposed borehole path, and the time used to consider all such data, precludes an ability to update the estimated or modeled formation parameters along the proposed borehole path in real time with the drilling process, where the update takes into account log data acquired while drilling. Stated otherwise, the time used to update the estimate or model of the formation properties along the proposed borehole path, taking into account the new log data along with all data from all the logs from all the boreholes, is too long for the updated estimate or model to be useful in making decisions regarding drilling, such as corrections or changes to drilling direction.

In accordance with at least some embodiments, the shortcomings of the related art are addressed, at least in part, by use of one or more equivalent logs along respective equivalent borehole paths (hereafter just "equivalent paths"). More particularly, the data from logs of two or more boreholes are used to create an equivalent log along an equivalent path, where the equivalent path in at least some embodiments does not correspond to an actual borehole. Thereafter, the estimate or model of the formation parameters along a proposed borehole path may be made using the equivalent log(s) along the equivalent path, where the number of equivalent logs is less than the number of actual logs, and thus the amount of data to consider in making the estimate or model is less. More particularly still, using the equivalent logs to make the estimate or model enables the estimate or model to be updated in real time with drilling along the proposed borehole path.

Turning again to FIG. 1, in addition to the first and second groups of boreholes 102 and 104, and the proposed borehole path 120, in accordance with at least some embodiments data from the first and second groups of boreholes 102 and 104 are used to create equivalent logs along equivalent paths. In the illustrative case of FIG. 1, the data from logs from first group of boreholes 102 is used to create an equivalent log along equivalent path 122 (shown as a dash-dot-dot-dash line), illustratively shown centered within the first group of boreholes 102. Likewise in the illustrative case of FIG. 1, the data from logs from the second group of boreholes 104 is used to create an equivalent log along equivalent path 124 (also shown as a dash-dot-dot-dash line), illustratively centered in the second group of boreholes 104.

A few points are in order with regard to the illustrative equivalent paths 122 and 124. While equivalent path 122 is shown approximately centered in the first group of boreholes 102, such centering is not required. The equivalent logs along the equivalent path 122 may be calculated even if the equivalent path is non-centered, or resides outside the geographic boundaries of the first group of boreholes 102. Moreover, the equivalent path 122 does not necessarily correspond to any actual borehole path. In many cases, the illustrative equivalent path 122 does not overlay or intersect any actual borehole. Further still, equivalent path 122 is show as vertical; however, the equivalent path may have vertical and deviated portions, including horizontal or lateral portions as desired. These points with respect to equivalent path 122 are equally applicable to illustrative equivalent path 124.

With respect to which actual boreholes are used in creating equivalent logs along an equivalent path, the illustrative first and second groups of boreholes 102 and 104 are geographically grouped to help facilitate a description of the various embodiments. However, a decision regarding to which equivalent path a particular borehole may be used in calculating equivalent logs may be arbitrary. In most cases, proximity of a borehole to a particular equivalent path dictates use of the borehole for the particular equivalent path, but for boreholes with similar proximity to multiple equivalent paths, selection or assigning of a borehole to a particular equivalent path may be arbitrary. Further still, as discussed with respect to FIG. 1, each borehole in the first group of boreholes 102 is used to calculate the equivalent logs along the equivalent path 122, and each borehole in the second group of boreholes 124 is used to calculate the equivalent logs along the equivalent path 124; however, the logs of less than all the boreholes in proximity to an equivalent path may be used in creating the equivalent logs.

Regardless of the precise nature of the equivalent paths 122 and 124, and the respective equivalent logs, in accordance with at least some embodiments the model or estimate of the formation properties along the proposed borehole path 120 is made using the equivalent logs in the equivalent paths 122 and 124. In some cases, the equivalent logs are used exclusively (e.g., with respect to the first and second groups of boreholes 102 and 104) to estimate or model the formation properties along the proposed borehole path 120. However, in other situations, the equivalent logs along the equivalent paths 122 and 124 are used in combination with one more actual logs along actual borehole paths, with the net result still being that less data need be considered when creating the estimate or model along the proposed borehole path. For example, logs taken in a closely spaced actual borehole may be used, along with equivalent logs that effectively contain the log data of more distance boreholes, to estimate or model the formation properties along the proposed borehole path.

Figure 2:
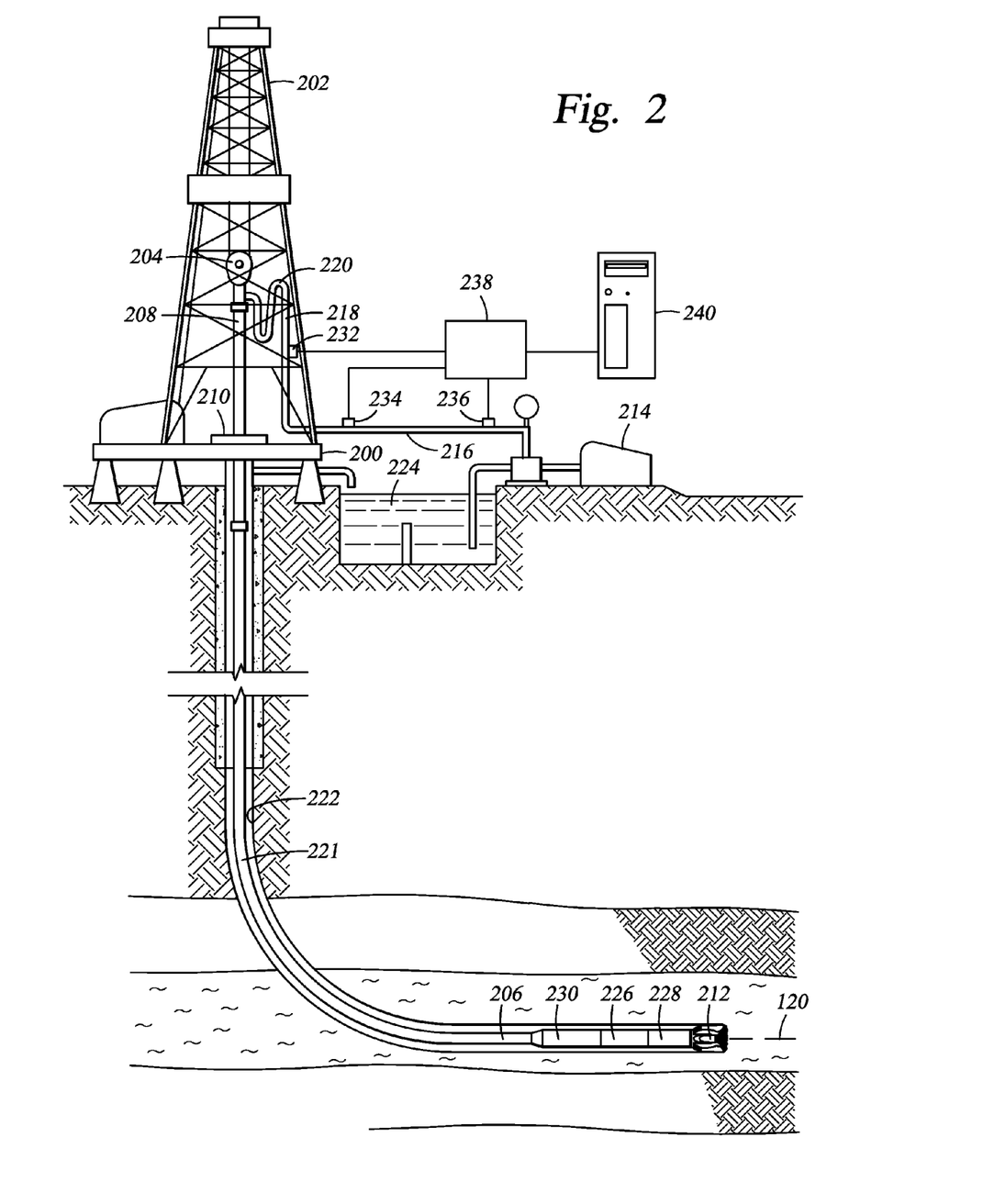
FIG. 2 shows a drilling system in accordance with at least some embodiments.

In order to more fully describe the embodiments regarding updating the estimate or model of the formation property in real time while drilling, attention now turns to the illustrative drilling system of FIG. 2, which shows a drilling operation in accordance with at least some embodiments. In particular, FIG. 2 shows a drilling platform 200 equipped with a derrick 202 that supports a hoist 204. Drilling in accordance with some embodiments is carried out by a string of drill pipes connected together by "tool" joints so as to form a drill string 206. The hoist 204 suspends a top drive 208 that is used to rotate the drill string 206 and to lower the drill string through the wellhead 210. Connected to the lower end of the drill string 206 is a drill bit 212. The drill bit 212 is rotated and drilling accomplished by rotating the drill string 206, by use of a downhole "mud" motor near the drill bit 212 that turns the drill bit, or by both methods. Drilling fluid is pumped by mud pump 214 through flow line 216, stand pipe 218, goose neck 220, top drive 208, and down through the drill string 206 at high pressures and volumes to emerge through nozzles or jets in the drill bit 212. The drilling fluid then travels back up the borehole via the annulus 221 formed between the exterior of the drill string 206 and the borehole wall 222, through a blowout preventer (not specifically shown), and into a mud pit 224 on the surface. On the surface, the drilling fluid is cleaned and then circulated again by mud pump 214. The drilling fluid is used to cool the drill bit 212, to carry cuttings from the base of the borehole to the surface, and to balance the hydrostatic pressure in the rock formations.

In accordance with the various embodiments, the drill string 206 employs at least one logging-while-drilling ("LWD") tool 226, and in some cases a measuring-while-drilling ("MWD") tool 228. The distinction between LWD and MWD is sometimes blurred in the industry, but for purposes of this specification and claims, LWD tools measure properties of the surrounding formation (e.g., porosity, permeability, speed of sound, electrical resistivity, drilling fluid invasion into the formation), and MWD tools measure properties associated with the borehole (e.g., inclination, direction, downhole drilling fluid pressure, downhole temperature, mud cake thickness). The tools 226 and 228 may be coupled to a telemetry module 230 that transmits data to the surface. In some embodiments, the telemetry module 230 sends data to the surface electromagnetically. In other cases, the telemetry module 230 sends data to the surface by way of electrical or optical conductors embedded in the pipes that make up the drill string 206. In yet still other cases, the telemetry module 230 modulates a resistance to drilling fluid flow within the drill string to generate pressure pulses that propagate at the speed of sound of the drilling fluid to the surface.

The LWD tool 226 may take many forms. In some cases, the LWD tool 226 may be a single tool measuring particular formation parameters, such as a tool to measure natural gamma radiation from the formation, or an acoustic tool that actively interrogates the formation to determine properties such as speed of sound, or differences in speed of sound along different stress regimes. In other embodiments, the LWD tool 226 may comprises a plurality of tools. For example, in many drilling situations a suite of LWD tools is included in the drill string 206, such as the combination known in the industry as "triple-combination" or "triple-combo" suite of LWD tools. Though there may be slight variance, in most cases the triple-combo suite of logging tools comprises a neutron porosity tool, a density porosity tool, and a resistivity tool.

Still referring to FIG. 2, in the illustrative case of data encoded in pressure pulses that propagate to the surface, one or more transducers, such as transducers 232, 234 and/or 236, convert the pressure signal into electrical signals for a signal digitizer 238 (e.g., an analog to digital converter). While three transducers 232, 234 and/or 236 are illustrated, a greater number of transducers, or fewer transducers, may be used in particular situations. The digitizer 238 supplies a digital form of the pressure signals to a computer 240 or some other form of a data processing device. Computer 240 operates in accordance with software (which may be stored on a computer-readable storage medium) to process and decode the received signals.

In accordance with at least some embodiments, at least a portion of the telemetry data sent to the surface by the telemetry module 230 is data collected by the LWD logging tool 226. The resulting telemetry data may be further analyzed and processed by computer 240 to directly make, or to assist a driller in making, changes and/or corrections to the drilling direction. More particularly still, the resulting telemetry data may comprise new actual log data taken by the LWD tool 226. Using the new actual log data, along with equivalent logs along respective equivalent paths, the computer system 240 may update the estimate or model of the formation parameters along portions of the proposed borehole path 120 that has yet to be drilled. From the updated estimate or model, drilling decisions may be made, such as: continuing along the current proposed borehole path 120; changing the location of the proposed current borehole path; or changing drilling parameters (e.g., weight on bit, bit RPM, direction). In yet still other embodiments, the calculations to update the model may be performed by a processor within the borehole.

The various embodiments discussed to this point have assumed distinct equivalent paths and proposed borehole path. For example, illustrative FIG. 1 shows equivalent paths 122 and 124, along with a distinct proposed borehole path 120. However, in accordance with yet still further embodiments, the location or path of an equivalent log may coincide with the location or path of proposed borehole. That is, rather than creating estimated or modeled formation parameters along the proposed borehole path based on equivalent logs in respective equivalent paths, the equivalent path may reside along the proposed borehole path. The specification from this point forward will continue to refer to the proposed borehole path 120, with the understanding that the proposed borehole path may also be an equivalent path with equivalent logs.

Figure 3:
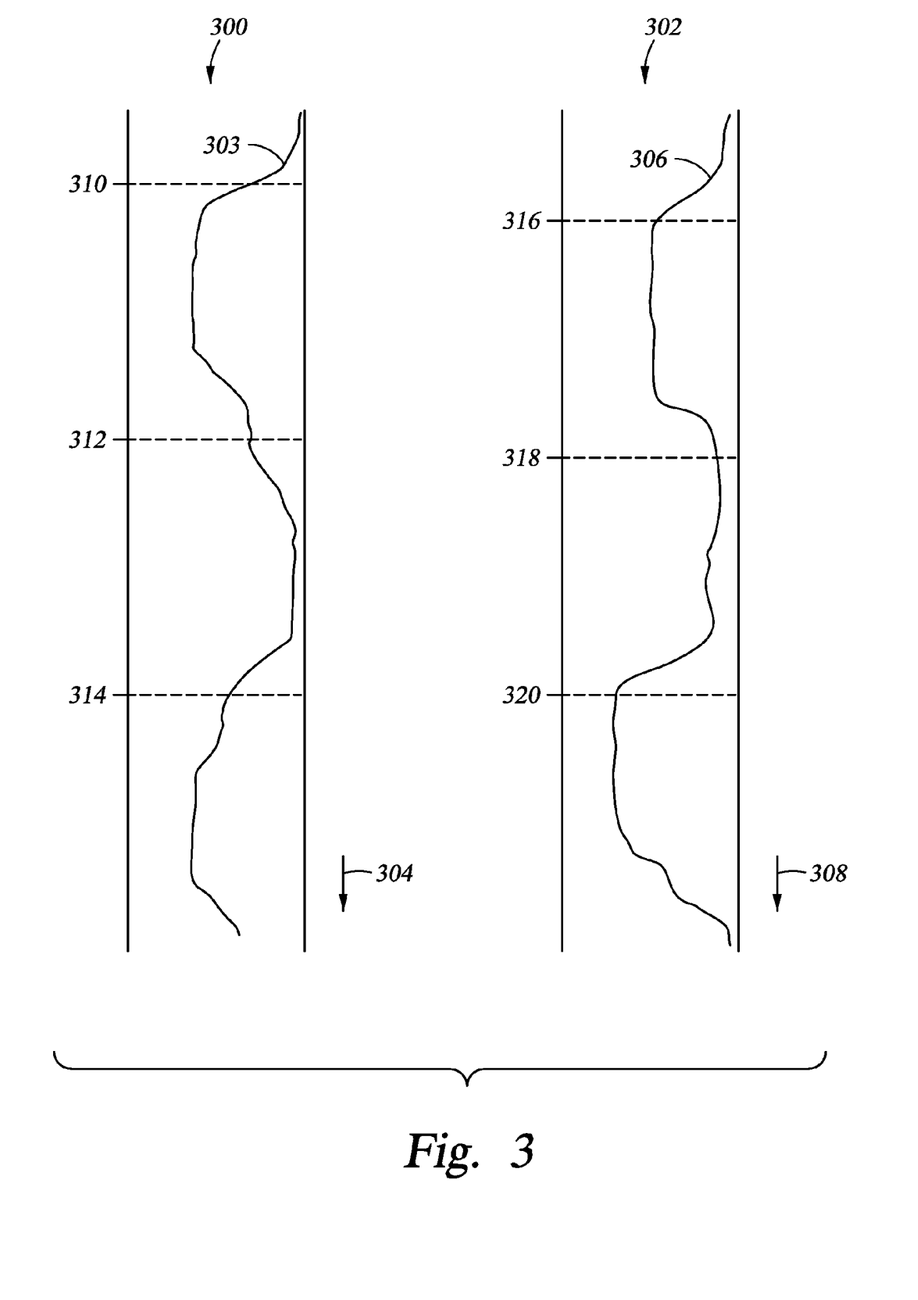
FIG. 3 shows illustrative logs, and use of such logs, in accordance with at least some embodiments.

In order to better describe the combining of actual logs from actual boreholes, the specification now turns to FIG. 3 which shows a plurality of logs in graphical form. In particular, FIG. 3 shows log 300, which may illustratively be taken in a first borehole, and log 302, which may illustratively be taken in a second borehole. Log 300 shows graphically a plurality of values (represented by the curve 303) and the respective depth along the vertical axis, with depth increasing downward as shown by arrow 304. Illustrative log 300 may show, for example, data values associated with a porosity measurement in the first borehole. Likewise, log 302 shows graphically a plurality of values (represented by the curve 306) and the respective depth along the vertical axis, with depth increasing downward as shown by arrow 308. Illustrative log 302 may show, for example, data values associated with porosity measure in the second borehole.

In accordance with at least some embodiments, each log is analyzed and locations noted therein where the actual borehole crosses a formation boundary. For example, in log 300 depth 310 may indicate a transition of the borehole through a boundary between different formation types. Likewise, depths 312 and 314 may represent transitions of the borehole through boundaries between different formation types. Likewise with respect to log 302, depths 316, 318, and 320 may represent transitions of the borehole through boundaries between different formation types. This same process is completed for each actual log in each actual borehole which will be used in creating equivalent logs along the equivalent path. In some cases, selecting the depths representing transitions may be a manual process, and in other cases software may have the ability to make the distinction (depending on the log type) and selection the depths of the transitions.

Figure 4:
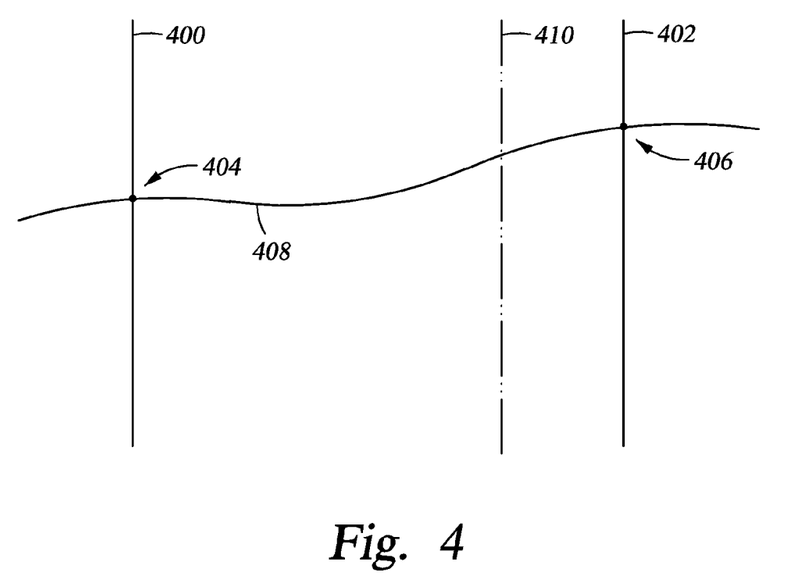
FIG. 4 shows a cross-sectional elevation view of boreholes to explain operation of at least some embodiments.

From the depth locations representing transitions between formation types, one or more "surfaces" are fictionally created. That is, corresponding transitions between formation types in each actual borehole are considered together to represent points of a fictional or mathematical surface that extends between all the actual boreholes. The surface thus represents the assumed location of the formation boundaries between and/or near the actual boreholes. FIG. 4 illustrates the concept for two actual boreholes. In particular, FIG. 4 shows a cross-sectional view of a first actual borehole 400 and a second actual borehole 402. Point or depth 404 represents a boundary between formation types (e.g., determined by analysis of a log) in the first actual borehole 400. Likewise, point or depth 406 represents a boundary between the formation types (e.g., determined by analysis of a log) in the second actual borehole 402. From these two transitions, a surface 408 is created, and the surface is assumed to represent the depth location of the transition between the formation types.

FIG. 4 is shown only with respect to two actual boreholes, and thus the surface 408 is a line, so as not to unduly complicate the description and drawings. However, many times in practice three or more actual boreholes will be used, and where the three or more boreholes are not linearly (in the straight line sense) aligned, the surface created will be a three-dimensional surface. The surface may be created by any available technique, such as a least squares curve fitting algorithm. Further, while FIG. 4 shows only one transition between formation types, in practice one or more transitions between formation types may be noted and used in creating the equivalent logs along the equivalent paths (e.g., the illustrative logs of FIG. 3 have three transitions).

A location for the equivalent path is selected, either before or after creation of the surface 408. In FIG. 4, the illustrative equivalent path 410 (shown in dash-dot-dot-dash line) resides between the two illustrative actual boreholes 400 and 402. Again, it is noted that the equivalent path need not reside between actual boreholes, and may reside outside the geographic boundaries of the actual boreholes. From the surface 408, the probable depth location along the equivalent path 410 of the transition between formation types may be determined. Moreover, using the actual logs in the actual boreholes 400 and 402, equivalent logs may be created along the equivalent path 410. For example, and referring simultaneously to FIGS. 3 and 4, if log 300 is a log taken in actual borehole 400, log 302 is a log taken in actual borehole 402, in the illustrative embodiments an equivalent log may be created corresponding equivalent path 410 using the logs 300 and 302 (or the underlying data). Any available mathematical or graphical technique may be used to combine the illustrative actual logs 300 and 302 to arrive at an equivalent log. For example, the values of the actual logs may be combined with a technique known as kriging. Kriging as a technique is known to those having ordinary skill, and thus so as not to unduly complicate this specification a more detailed explanation of kriging is omitted.

In the illustrative situation represented by FIGS. 3 and 4, an equivalent log created from the actual logs of FIG. 3 is a combination of the data of the logs of FIG. 3, and thus will look very similar to the logs of FIG. 3. However, when the equivalent log along the equivalent path 410 is used for further processing rather than the actual logs, less data need be considered. Stated otherwise, the amount of data in the equivalent log along the equivalent path 410, though represented all the log data, is less than the amount of data of the actual logs 300 and 302. The illustrative situation of FIG. 4 has only two actual logs; however, the various embodiments contemplate combining actual logs from any number of actual boreholes into equivalent logs. For example, in a particular embodiment actual logs from one hundred or more actual wells may be combined into a single equivalent log along an equivalent path. When further processing is performed (e.g., to estimate or model formation parameters along a proposed borehole path, discussed more below), the amount of data to analyze in performing the further processing is significantly less than if all the logs of the illustrative one hundred or more actual boreholes are used.

The illustrative discussion regarding FIGS. 3 and 4 assumed a single log (of the same type) taken in each actual borehole. However, as mentioned above, twenty or more logs of varying types may be taken in each actual borehole. It follows that multiple equivalent logs may be created for each equivalent path. For example, if illustrative actual boreholes 400 and 402 each have a neutron porosity log, a density porosity log, and a resistivity log, then it is possible to create an equivalent log for each of the recited types along the equivalent path. Thus, in the illustrative situation the equivalent logs calculated may comprise an equivalent neutron porosity log, an equivalent density porosity log, and an equivalent resistivity log.

Figure 5:
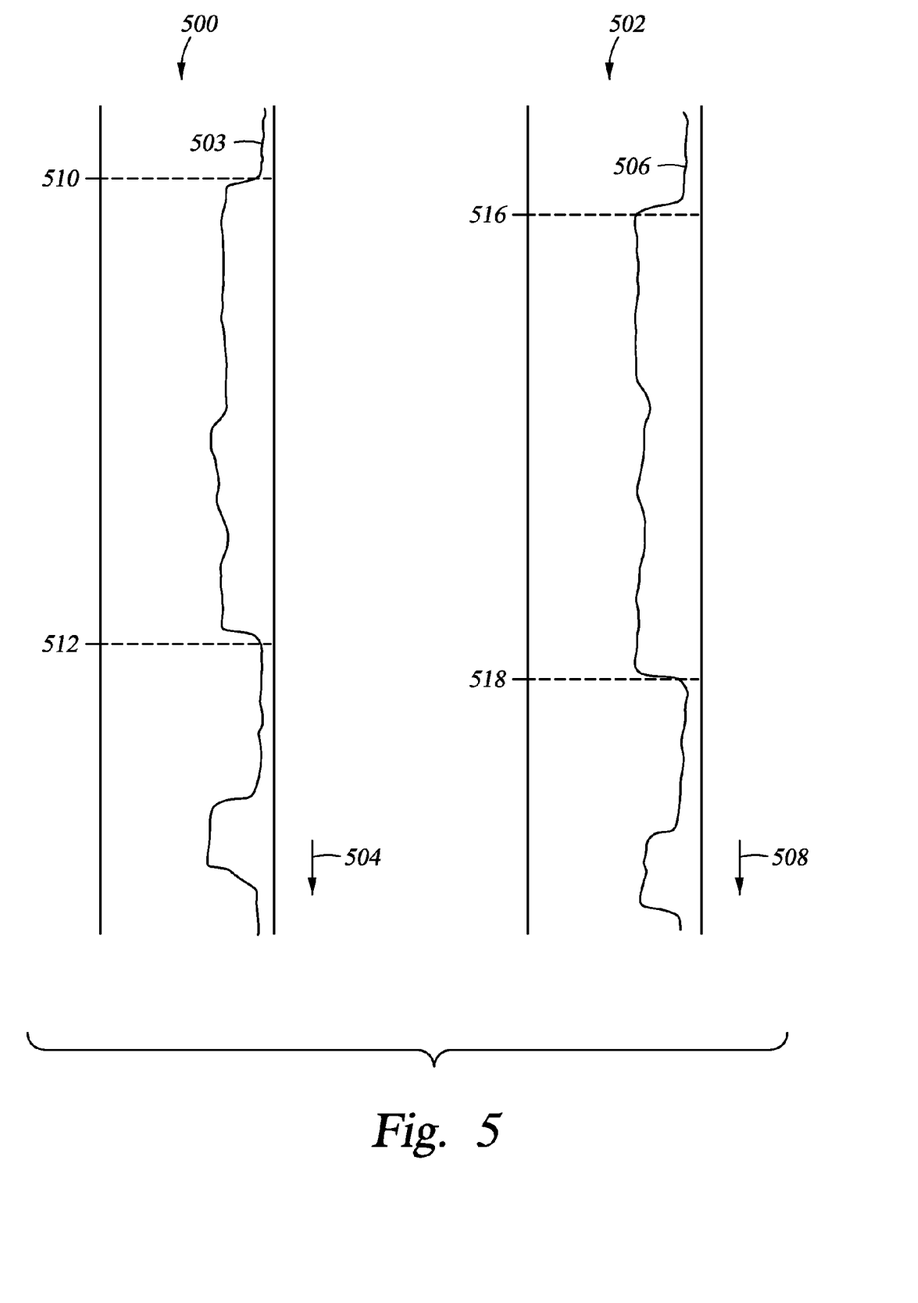
FIG. 5 shows illustrative equivalent logs in accordance with at least some embodiments.

The specification now turns to using equivalent logs along equivalent paths to estimate or model formation parameters along a proposed borehole path, with reference to FIG. 5. In particular, FIG. 5 shows equivalent log 500 associated with a first equivalent path, and equivalent log 502 associated with a second equivalent path. Equivalent log 500 shows graphically a plurality of values (represented by the curve 503) and the respective depth along the vertical axis, with depth increasing downward as shown by arrow 504. Illustrative equivalent log 500 may show, for example, data values associated with an equivalent resistivity log along the first equivalent path. Likewise, equivalent log 502 shows graphically a plurality of values (represented by the curve 506) and the respective depth along the vertical axis, with depth increasing downward as shown by arrow 508. Illustrative equivalent log 502 may show, for example, data values associated with calculated equivalent resistivity log along the second equivalent path.

In accordance with at least some embodiments, each equivalent log, by virtue of the process that the equivalent logs are created, has locations noted therein of transitions across formation boundaries. For example, in equivalent log 500 depth 510 may indicate the assumed location of a transition of the between different formation types. Likewise, depth 512 may represent a transition between different formation types. Likewise with respect to log 502, depths 516 and 518 may represent transitions between different formation types.

Figure 6:
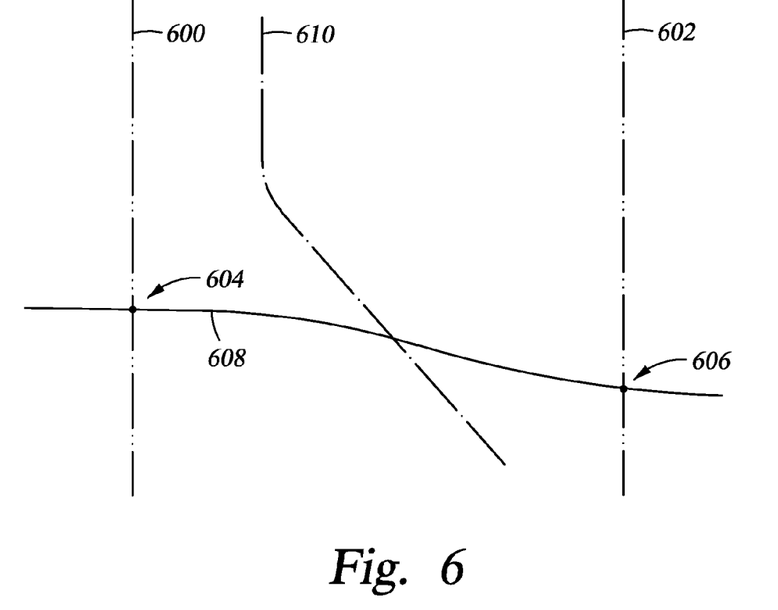
FIG. 6 shows a cross-sectional elevation view of equivalent paths and a proposed borehole path in accordance with at least some embodiments.

From the depth locations representing transitions between formation types in the equivalent logs, one or more surfaces are fictionally created. FIG. 6 illustrates the concept for two equivalent logs. In particular, FIG. 6 shows a cross-sectional view of a first equivalent path 600 (shown as a dash-dot-dot-dash line) and a second equivalent path 602 (also shown as a dash-dot-dot-dash line). Point or depth 604 represents a boundary between formation types along the first equivalent path 600. Likewise, point or depth 606 represents a boundary between the formation types along the second equivalent path 602. From these two transitions, a surface 608 is created, and the surface is assumed to represent the depth location of the transition between the formation types.

FIG. 6 is shown only with respect to two equivalent paths, and thus the surface 608 is a line, so as not to unduly complicate the description and drawings. However, in most embodiments three or more equivalent paths will be used, and where the three or more equivalent paths are not linearly (in the straight line sense) aligned, the surface created will be a three-dimensional surface. The surface may be created by any available technique, such as a least squares curve fitting algorithm. Further, while FIG. 6 shows only one assumed location of a transition between formation types, in practice one or more transitions between formation types may be noted and used in creating the equivalent logs along the equivalent paths (e.g., the illustrative equivalent logs of FIG. 5 have two transitions).

The location for the proposed borehole path is known or selected, in most cases before creation of the surface 608, but the timing may be equivalently reversed. In FIG. 6, the proposed borehole path 610 (shown in dash-dot-dash line) resides between the two illustrative equivalent paths 600 and 602. The proposed borehole path need not reside between equivalent paths, and may reside outside the geographic boundaries of the equivalent paths. From the surface 608, the probably depth location along the proposed borehole path 610 of the transition between formation types may be estimated. Moreover, using the equivalent logs along the equivalent paths 600 and 602, formation parameters along the proposed borehole path 610 may be estimated or modeled. In some cases, the estimate or model may involve creation of one or more equivalent logs along the proposed borehole path 610. For example, and referring simultaneously to FIGS. 5 and 6, if equivalent log 500 is an equivalent log along equivalent path 600, and equivalent log 502 is an equivalent log along equivalent path 602, in the illustrative embodiments an equivalent log may be created corresponding to proposed borehole path 610 using the equivalent logs 500 and 502 (or the underlying data). Any available mathematical or graphical technique may be used to combine the illustrative equivalent logs 500 and 502 to arrive at an equivalent log along the proposed borehole path 610. For example, the values of the actual logs may be combined by kriging.

In the illustrative situation represented by FIGS. 5 and 6, the estimate or model of the formation parameters along the proposed borehole path 610 is thus based on the data of the equivalent logs of FIG. 5. However, as an actual borehole is drilled along the proposed borehole path 610 and logs taken in the new actual borehole, the formation properties along the portion of the proposed borehole path 610 may be updated using the equivalent logs along the illustrative equivalent paths 600 and 602 and the new actual logs. Overall, less data need be considered in the updating processing than in the related art where a larger group of actual logs in actual wells may be used.

The illustrative situation of FIG. 6 has only two equivalent paths and associated equivalent logs; however, the various embodiments contemplate combining equivalent logs from any number of equivalent paths. For example, in a particular embodiment actual logs from one hundred or more actual wells may be combined into equivalent logs along equivalent paths, where the number of equivalent paths is significant less than the number of actual boreholes. When further processing is performed (e.g., to update the estimate or model formation parameters along a proposed borehole path), the amount of data to analyze in performing the further processing is significantly less than if all the logs of the illustrative one hundred or more actual boreholes are used. In most cases, it is contemplated that 10 or fewer equivalent paths will be used, and in most cases five or fewer. In situations such as estimating or modeling formation parameters along a lateral proposed borehole path, two equivalent paths may be used, with one equivalent path near the vertical portion of the borehole, and the second equivalent path near the proposed distal end of the proposed borehole path. In yet still further cases, a single equivalent path and corresponding equivalent logs may coincide with the proposed borehole path.

The illustrative discussion regarding FIGS. 5 and 6 assumed a single log (of the same type) calculated for each equivalent path. However, there may be a plurality of equivalent log types calculated along each equivalent path. It follows that multiple equivalent logs may be used or created along the proposed borehole path. For example, if illustrative equivalent paths 600 and 602 each have a neutron porosity log, a density porosity log, and a resistivity log, then it is possible to create an equivalent log for each of the recited types along the proposed borehole path as the estimate or model of formation properties, or as an intermediate step in making the estimate or model of the formation properties.

Inasmuch as a fewer number of equivalent paths are used in updating (as compared to using actual logs from actual boreholes in proximity), the updating of the estimate or model along the proposed borehole path 610 may be completed in real time with drilling along the proposed borehole path. It should be understood that real time does not mean instantaneously, as the data from the actual logs taken while drilling require a finite amount of time to be telemetered to the surface. Moreover, the calculation of the updated estimate or model along portions of the proposed borehole path yet to be drilled take a finite amount of time. Nevertheless, the amount of time to receive the data and perform the calculation is significantly less than if all the actual logs from actual boreholes are used, and in any event the updated or estimated formation parameters along the proposed borehole path should be available before the increases in length by 100 feet, and in many cases before the borehole increases by 50 feet.

It is also noted that the estimate or model of the formation parameters along the proposed borehole path may also be useful with regard to parameters associated with drilling. For example, in some cases the estimate or model may be used to estimate drilling parameters such as the rate of penetration of the drill bit through formations along the proposed borehole path, revolutions per minute of the drill bit, a desired weight-on-bit for while within formations along the proposed borehole path, and an estimated amount of time to drill through formations along the proposed borehole path.

Figure 7:
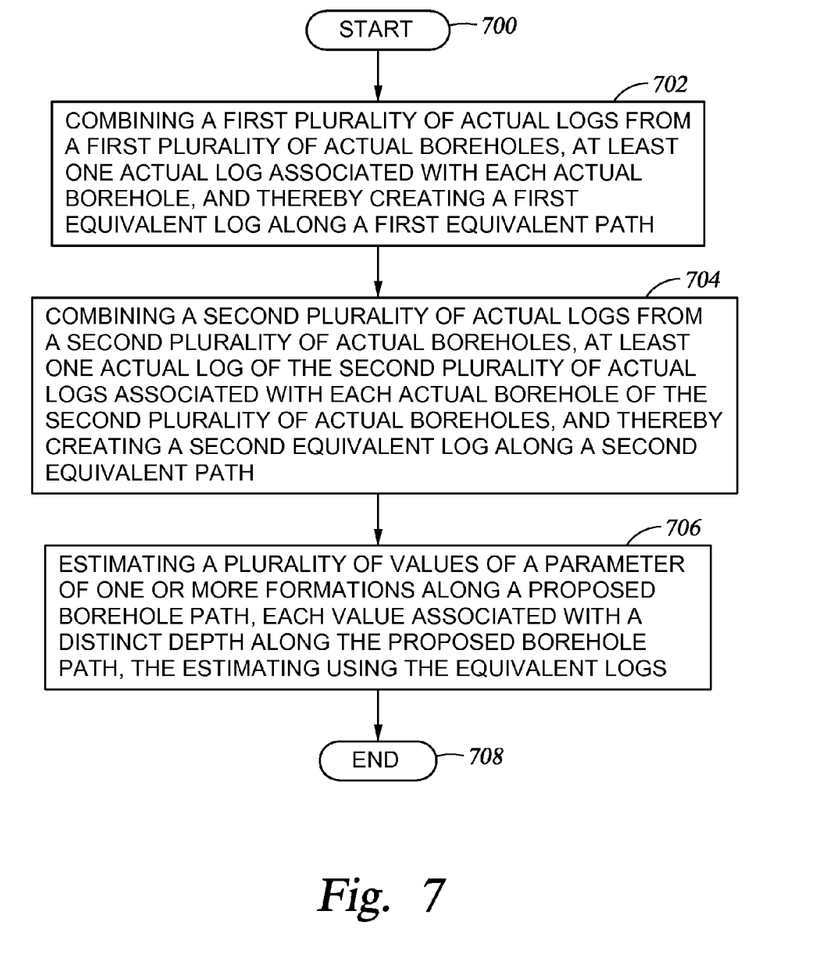
FIG. 7 shows a method in accordance with at least some embodiments.

FIG. 7 shows a method in accordance with at least some embodiments, some or all of which may be implemented in software. In particular, the method starts (block 700), and comprises: combining a first plurality of actual logs from a first plurality of actual boreholes, at least one actual log associated with each actual borehole, and thereby creating a first equivalent log along a first equivalent path (block 702); combining a second plurality of actual logs from a second plurality of actual boreholes, at least one actual log of the second plurality of actual logs associated with each actual borehole of the second plurality of actual boreholes, and thereby creating a second equivalent log along a second equivalent path (block 704); and estimating a plurality of values of a parameter of one or more formations along a proposed borehole path, each value associated with a distinct depth along the proposed borehole path, the estimating using the equivalent logs (block 706). Thereafter, the method ends (block 708). The parameters estimate may comprises porosity, speed of sound, total organic content, an indication of susceptibility to hydraulic fracture, water saturation, hydrocarbon saturation, permeability, resistivity, formation type, pore pressure, and the like.

Figure 8:
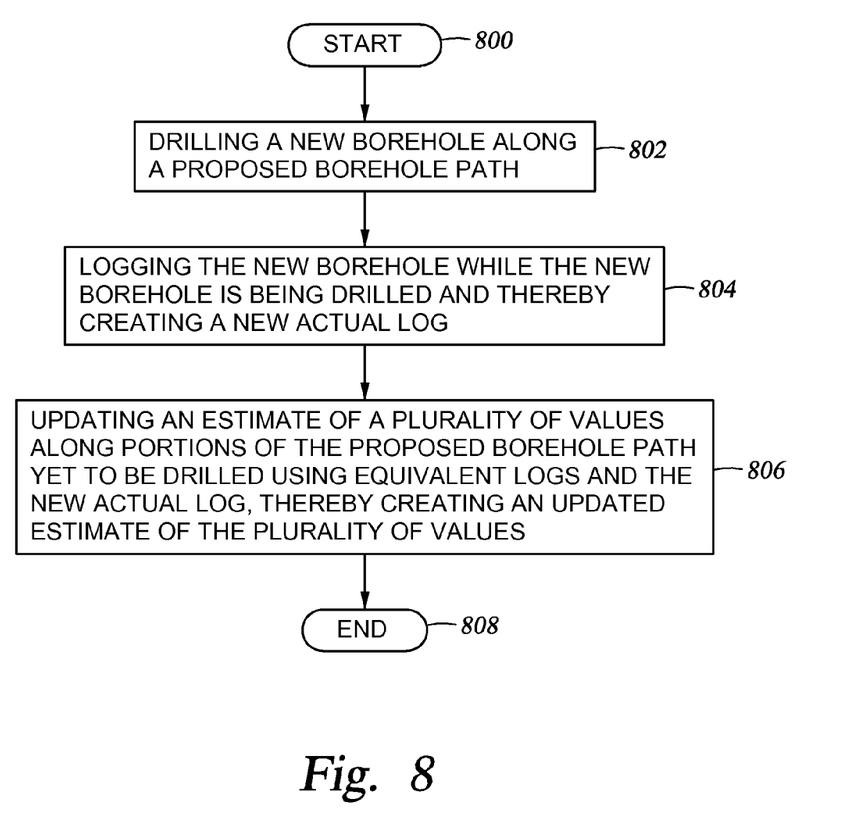
FIG. 8 shows a method in accordance with at least some embodiments.

FIG. 8 shows a method in accordance with at least some embodiments, portions of which may be implemented in software. In particular, the method starts (block 800), and comprises: drilling a new borehole along a proposed borehole path (block 802); logging the new borehole while the new borehole is being drilled and thereby creating a new actual log (block 804); and updating an estimate of a plurality of values along portions of the proposed borehole path yet to be drilled using equivalent logs and the new actual log, thereby creating an updated estimate of the plurality of values (block 806). Thereafter, the method ends (block 808).

Figure 9:
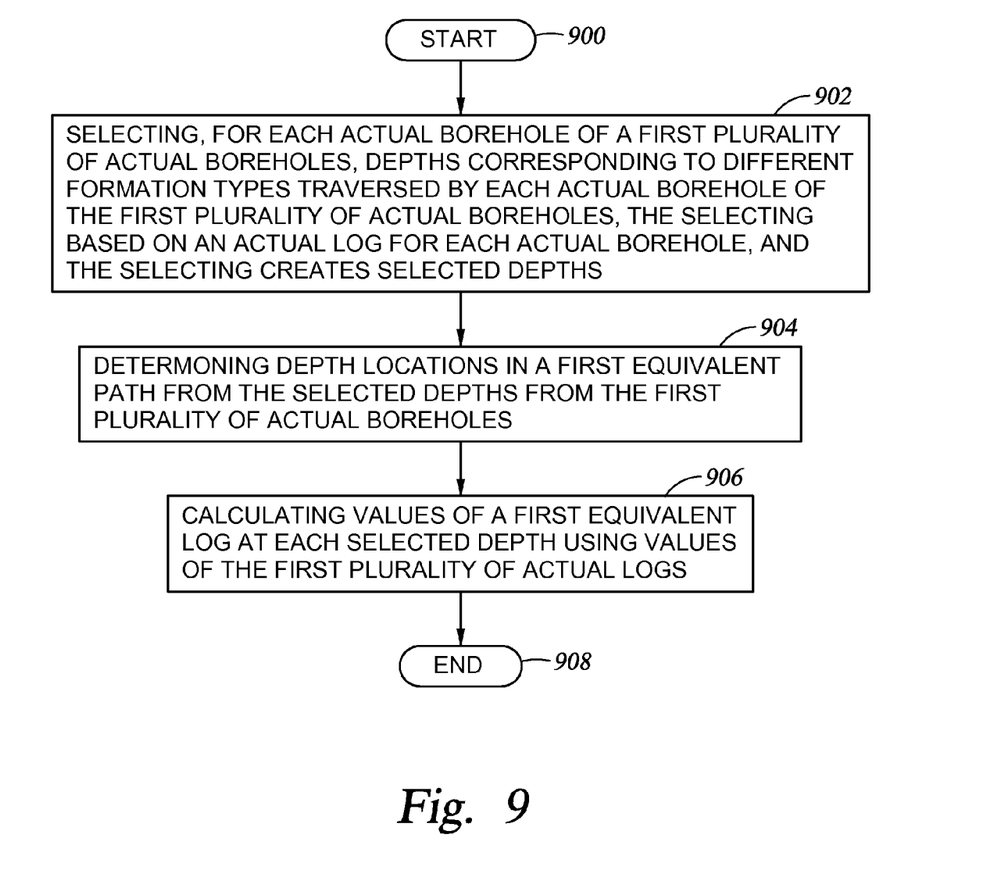
FIG. 9 shows a method in accordance with at least some embodiments.

FIG. 9 shows a method in accordance with at least some embodiments, some or all of which may be performed by software. In particular, the method starts (block 900), and comprises: selecting, for each actual borehole of a first plurality of actual boreholes, depths corresponding to different formation types traversed by each actual borehole of the first plurality of actual boreholes, the selecting based on an actual log for each actual borehole, and the selecting creates selected depths (block 902); determining depth locations in a first equivalent path from the selected depths from the first plurality of actual boreholes (block 904); and calculating values of a first equivalent log at each selected depth using values of the first plurality of actual logs (block 906). Thereafter, the method ends (block 908).

Figure 10:
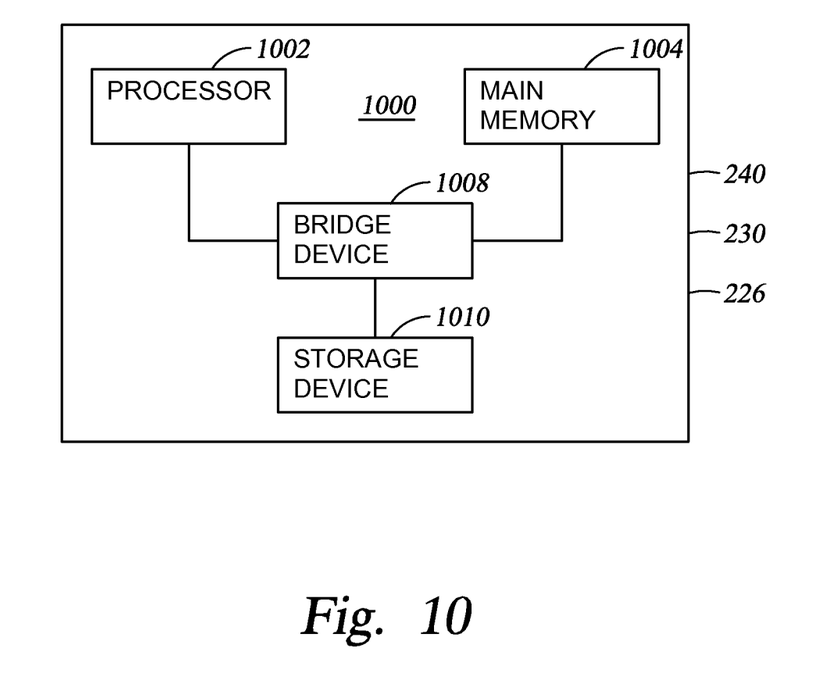
FIG. 10 shows a computer system in accordance with at least some embodiments.

FIG. 10 illustrates in greater detail a computer system 1000 which may be used to calculate equivalent logs, and may also be used to estimate or model formation parameters along a proposed borehole path as discussed above. The computer system 1000 thus may be illustrative of the surface computer system 240, the telemetry module 230, and/or the one or more LWD tools 226. Thus, the computer system 1000 described with respect to FIG. 10 could be at the surface near (but physically outside) the borehole during the drilling along the proposed borehole path is taking place, the computer system 1000 could be located at the central office of the oilfield services company, the computer system 1000 could be within the telemetry module 230 (and thus in the borehole), or the computer system 1000 could be within the one or more logging tools 226 (and thus in the borehole). The computer system 1000 comprises a processor 1002, and the processor couples to a main memory 1004 by way of a bridge device 1008. Moreover, the processor 1002 may couple to a long term storage device 1010 (e.g., a hard drive) by way of the bridge device 1008. Programs executable by the processor 1002 may be stored on the storage device 1010, and accessed when needed by the processor 1002. The program stored on the storage device 1010 may comprise programs to implement the various embodiments of the present specification, including programs to calculate equivalent logs, and programs to estimate or model formation parameters along proposed borehole paths (including updating the estimate of model) in real time with the drilling along the proposed borehole path. In some cases, the programs are copied from the storage device 1010 to the main memory 1004, and the programs are executed from the main memory 1004. Thus, both the main memory 1004 and storage device 1010 are considered computer-readable storage mediums.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory (i.e., not an electrical signal or carrier wave) computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, while the various embodiments have been shown in connection with a drill string created from individual pipe sections, the various embodiments equally applicable to drilling situations where coiled tubing is used, in connection with a downhole "tractor" which provides drilling force on the drill bit. It is intended that the following claims be interpreted to embrace all such variations and modifications.

What is claimed is:

1. A method comprising:
   combining, by way of a computer system, a first plurality of actual logs from a first plurality of actual boreholes, at least one actual log associated with each actual borehole, and thereby creating a first equivalent log along a first equivalent path, wherein the first equivalent path is distinct from the first plurality of actual boreholes;

combining, by way of a computer system, a second plurality of actual logs from a second plurality of actual boreholes, at least one actual log of the second plurality of actual logs associated with each actual borehole of the second plurality of actual boreholes, and thereby creating a second equivalent log along a second equivalent path, wherein the second equivalent path is distinct from the second plurality of actual boreholes; and estimating a plurality of values of a parameter of one or more formations along a proposed borehole path, each value associated with a distinct depth along the proposed borehole path, the estimating using the equivalent logs.

2. The method of claim 1 further comprising:
drilling a new borehole along the proposed borehole path;
logging the new borehole while the new borehole is being drilled and thereby creating a new actual log; and
updating the estimate of the plurality of values along portions of the proposed borehole path yet to be drilled using the equivalent logs and the new actual log, thereby creating an updated estimate of the plurality of values.

3. The method of claim 2 wherein updating the estimate further comprises updating in real time with the drilling.

4. The method of claim 2 further comprising changing a drilling parameter based on the updated estimate of the plurality of values.

5. The method of claim 2 further comprising predicting at least one drilling parameter from the updated estimate of the plurality of values, the updated drilling parameter being at least one selected from the group consisting of: revolutions per minute of the drill bit; desired weight-on-bit; and time to drill at least a portion of a borehole along the proposed borehole path.

6. The method of claim 1 wherein estimating the plurality of values further comprises kriging to determine at least one value, the kriging using values from the first and second equivalent logs.

7. The method of claim 1 wherein combining the first plurality of actual logs further comprises:
selecting, for each actual borehole of the first plurality of actual boreholes, depths corresponding to different formation types traversed by each actual borehole of the first plurality of actual boreholes, the selecting based on an actual log for each actual borehole, and the selecting creates selected depths;
determining depth locations in the first equivalent path from the selected depths from the first plurality of actual boreholes; and
calculating values of the first equivalent log at each selected depth using values of the first plurality of actual logs.

8. The method of claim 7 wherein calculating values of the first equivalent log further comprises kriging to determine at least one value of the first equivalent log, the kriging using values from the plurality of actual logs.

9. A method comprising:
combining a plurality of actual logs taken in a respective plurality of actual boreholes, and thereby creating a first equivalent log along a proposed borehole path, wherein the proposed borehole path is distinct from the actual boreholes;
drilling a new borehole along the proposed borehole path;
logging the new borehole while the new borehole is being drilled and thereby creating a new actual log; and
updating the equivalent log along portions of the proposed borehole yet to be drilled using the equivalent log and the new actual log, thereby creating an updated equivalent log.

10. The method of claim 9 wherein updating further comprises updating in real time with the drilling.

11. The method of claim 9 further comprising predicting at least one drilling parameter from the updated equivalent log.

12. The method of claim 11 wherein predicting at least one drilling parameter further comprises predicting at least one selected from the group consisting of: revolutions per minute of the drill bit; desired weight-on-bit; and time to drill at least a portion of the borehole along the proposed borehole path.

13. The method of claim 9 wherein combining the plurality of actual logs further comprises:
selecting, for each actual borehole of the first plurality of actual boreholes, depths corresponding to different formation types traversed by the actual borehole, the selecting based on one or more actual logs of each actual borehole;
determining depth locations in the proposed borehole path from the selected depths from the first plurality of actual boreholes; and
calculating the equivalent log at each selected depth using values of the plurality of actual logs.

14. The method of claim 13 wherein calculating values of the equivalent log further comprises kriging to determine at least one value of the equivalent log, the kriging using values from the plurality of actual logs.

15. A system comprising:
a logging tool being part of a drill string, the drill string comprising a drill bit and the drill string located in a borehole;
a processor associated with the logging tool;
a memory coupled to the processor, the memory storing a program that, when executed by the processor, causes the processor to:
receive data determined by the logging tool while drilling, the data indicative of a parameter of a formation penetrated by the borehole; and
estimate, in real time with the drilling by the drill string, a property of a portion of the formation along a proposed borehole path yet to be drilled, the estimation of the property using data from the logging tool and an equivalent log along an equivalent path, wherein the equivalent path is distinct from the borehole.

16. The system of claim 15 wherein when the program estimates, the program causes the processor to estimate using the equivalent log along the equivalent path where at least a portion of the equivalent path coincides with a proposed borehole path.

17. The system of claim 15 wherein when the program estimates, the program causes the processor to estimate using the equivalent log along the equivalent path where the equivalent path is offset from a proposed borehole path.

18. The system of claim 15 wherein when the program estimates, the program causes the processor to estimate using a plurality of equivalent logs associated with a respective plurality of equivalent paths, each equivalent path offset from a proposed borehole path.

19. The system of claim 15 wherein the processor and memory are disposed in the drill string.

20. The system of claim 15 wherein the processor and memory are disposed at the surface, and the data determined by the logging tool is sent to the surface.

21. The system of claim 15 wherein the drill string is at least one selected from the group consisting of: a drill string where rotary motion is imparted to the drill string from the surface; a drill string where rotary motion is imparted to the drill string by way of a down-hole mud motor.

* * * * *